United States Patent [19]

Poulain et al.

[11] Patent Number: 4,666,870

[45] Date of Patent: May 19, 1987

[54] FLUORIDE GLASSES

[76] Inventors: Marcel J. Poulain, 33, Boulevard Charles Peguy, 35000 Rennes; Michel A. Poulain, Lotissement de la Janaie, 35530 Servon-sur-Vilaine; Gwenael A. Maze, 1, rue de Brilhac, 35000 Rennes, all of France

[21] Appl. No.: 883,330

[22] Filed: Jul. 8, 1986

Related U.S. Application Data

[63] Continuation-in-part of Ser. No. 781,311, Sep. 27, 1985, abandoned, which is a continuation of Ser. No. 244,280, Mar. 16, 1981, abandoned, which is a continuation of Ser. No. 562,031, Dec. 15, 1983, abandoned, which is a continuation of Ser. No. 682,830, Dec. 19, 1984, abandoned.

[30] Foreign Application Priority Data

Mar. 18, 1980 [FR] France ............................... 80 06088

[51] Int. Cl.⁴ ............................ C03C 3/32; C03C 6/06
[52] U.S. Cl. ........................................ 501/40; 501/30
[58] Field of Search ................................ 501/40, 30

[56] References Cited

U.S. PATENT DOCUMENTS

| | | | |
|---|---|---|---|
| 2,466,509 | 4/1949 | Sun | 501/40 |
| 2,511,224 | 6/1950 | Sun | 501/40 |
| 2,819,977 | 1/1958 | De Paolis | 501/40 |
| 4,141,741 | 2/1979 | Lucas et al. | 501/40 |
| 4,244,722 | 1/1981 | Tsaya et al. | 65/32 |
| 4,308,066 | 12/1981 | Mitachi et al. | 501/40 |
| 4,328,318 | 5/1982 | Miranday | 501/40 |
| 4,346,176 | 8/1982 | Kanamori et al. | 501/40 |

FOREIGN PATENT DOCUMENTS

| | | | |
|---|---|---|---|
| 2077731 | 11/1971 | France . | |
| 2396981 | 2/1979 | France | 350/96.34 |

OTHER PUBLICATIONS

Doroning, V. P. et al., "Optical Properties of Fluoroberyllium Glasses Activated by Terbium", J. Amer. Cer. Soc., Ceramic Abstracts, vol. 53, (1970), p. 5.
Chem. Abs. 90 (1979) item 212565w, p. 569, Videau et al., "Elaboration and Optical Properties of New Neodymium-Activated Fluoride Glass".
Chem. Abs. 91 (1978), item 180056h, p. 297, Lecoq, A. et al., "Lanthanum Fluozirconate Glasses".
Chem. Abs. 92 (1980), item 133788; p. 312, Miranday J. P. et al., "New Glasses Formed by Transition Element Fluorides".
Miranday, J. P. et al., "Nouveaux verres Formes par les Fluores d'Elements de Transition", Revue de Chimie Minerals 16(4), 1979, pp. 277–282.
Videau, J. J. et al., Sur de Nouveaux Verres Aluminofluores", Rev. Chim. Min. 16(4), 1979, pp. 393–399.
Shannon, R. D., "Revised Effective Ionic Radii and Systematic Studies of Interatomic Distances in Halides and Chalcogenides", Acta Cryst. (1976), A 32, pp. 751–767.
Poulain, Marcel, "Glass Formation in Ionic Systems", Nature, vol. 293, No. 5830, 9/24/1981, pp. 279–280.
San, K. H., "Fluoride Glasses"—Glass Technology, 20(1), Feb. 1979, pp. 36–40.
Mitachi et al., "Fluoride Glass Fiber for Infrared Transmission", Jap. J. of Applied Physics, 19 (6), Jun. 1980, pp. 2313–2314.
Chem. Abs. 92 (1980) item 133787h; p. 312, Poulain et al., "Comparative Study of Fluoride Glasses in Ternary Diagrams of Zirconium Fluoride, Barium Fluoride–$MF_n$(M=Na, Ca, Lm, Th; n=1, 2, 3, 4)".

Primary Examiner—Mark L. Bell
Attorney, Agent, or Firm—Laff, Whitesel, Conte & Saret

[57] ABSTRACT

The invention relates to a beryllium free fluoride glass composition used to prepare fluoride glass and the fluoride glass prepared by the composition. The fluoride composition contains only fluoride compounds and does not contain any oxygen atoms.

36 Claims, No Drawings

FLUORIDE GLASSES

This is a continuation-in-part of U.S. patent application Ser. No. 781,311, filed Sept. 27, 1985 (now abandoned), which in turn was a continuation of U.S. patent application Ser. No. 244,280, filed Mar. 16, 1981 (now abandoned); a continuation U.S. patent application Ser. No. 562,031, filed Dec. 15, 1983 (now abandoned); and a continuation U.S. patent application Ser. No. 682,830 filed Dec. 19, 1984 (now abandoned).

The present invention relates to new compositions used to prepare fluoride glasses and to the fluoride glass prepared therewith.

The existence of completely fluorinated glasses is known. But for a long time it has been an isolated phenomenon with limited industrial applications. The first notable works were related to the combination beryllium flouride $BeF_2$ and silica $SiO_2$. These works were mainly carried out by KUAN-HAN SUN and lead to several patents and scientific papers which are summarized in the article of WALTER JAHN "Mehrstoffsysteme zum Aufbau optischer Glser, Tell III: Neue optische Glser auf Flouridbasis" published in Glastechnische Berichte, March 1961, p. 107–120.

Beryllium fluoride however is fairly expensive and toxic. These problems when also combined with the added moisture sensitivity of the related glasses were serious hindrances to their development and use.

The research on fully fluorinated glassy materials was carried further with the discovery of zirconium tetrafluoride glasses by M. POULAIN, M. POULAIN, and J. LUCAS. The glass compositions and their techniques of preparation are described in the U.S. Pat. No. 4,414,741.

One specific aspect of this discovery stands is the fact that these glasses do not belong to any kind of previously known glasses and that they differ from them by their structure and by their chemistry. Most properties of these materials logically proceed from their composition and their structure. These results are reported in the article by M. POULAIN and J. LUCAS: "Une nouvelle classe de materiaux: les verres fluores au tetrafluorure de zirconium" published in the journal "Verres et Refractaires", volume 32, n 4, 1978, p. 505–513.

Then the question was to know whether the fluoride glass was related to the specific chemical character of zirconium or hafnium or whether it proceeded from some much more general mechanism of the stabilization of complex fluorides in an amorphous state. In the first case, the potential development of these glasses was limited by the zirconium characteristics in fluoride medium, especially related to softening, fusion and decomposition temperatures, resistance to aqueous solution, and infrared transmittance. On the contrary, the possibility of fluoride glasses without zirconium or hafnium made it conceivable that the synthesis of glasses could be used in a larger thermic field offering a better chemical resistance and a larger spectral transparency.

An indication of this fundamental question may be already found in the U.S. Pat. No. 2,466,509, which discloses fluoride glasses prepared from the combination of the fluorides $PbF_2$, $AlF_3$, $MgF_2$, $SrF_2$. The results obtained quite recently by J. P. MIRANDY, C. JACOBON and R. DE PAPE bring a definitive confirmation of the second hypothesis. These works described in the paper: "Nouveaux verres formes par les fluorures d'elements de transition" in Revue de Chimi Minerale, t. 6, 1979, p. 277–282 have been the matter of the pending French patent n 79.07785 and show that fluoride glasses can be prepared from ternary combinations of transit metals fluorides ($CrF_3$, $FeF_3$, $MnF_2$, $CuF_2$, $ZnF_2$, $GaF_3$) and alkaline, earth alkaline or lead fluoride, with possible mixing of rare earth fluorides.

It is then obvious that the existence of fluoride glasses is a more general phenomenon than is suggested by the observation of the first glass compositions. One must therefore watch such glass formation conditions. The classical theories of the vitreous state based on the existence of a vitreous network built by the non-periodic association of tetrahedra or small polyhedra are quite inadequate as they imply some strong covalency in the anion-cation bonding, inconsistent with the major ionicity of fluoride solids. Also, they involve some distinction between network formers and network modifiers without any acceptable geometrical criterion in the case of fluoride glasses. For example, a similar coordination polyhedra may be constructed by zirconium, considered as a network former, and by sodium as a network modifier. Furthermore, the concept of vitreous network which has some experimental basis in the case of silica is a mere abstraction in the case of fluoride glasses.

Recent works in the field of disordered crystalline phases allow a more coherent theoretical approach of the problem. Studies related to fluorite-type non-stoichiometric phases lead Dr. BEVAN to define the concept of anion glass. The spacial distribution of anions, ususally $F^-$ anions, is closer to that of a liquid than to that of a crystal. Therefore, some ordering parameter arises from the regular cationic distribution, which results in a pseudo-cubic symmetry of the X-Ray or Neutron diffraction pattern. The main features of this analysis can be found in the paper intitled "Fluorine deficient tysonite type solid solutions and realted phases" in Revue de Chimie Minerale, t. 15-1978, p. 346–359.

Similar observations have been made by B. C. TOFIELD, M. POULAIN and J. LUCAS in their study of $ReO_3$-type fluorinated non stoechiometric phases as reported in the paper intitled "The structure of $Zr_{0.8}Yb_{0.2}O_{3.2}$ ($MX_{3.5}$) by powder netron diffraction" in Journal of Solid State Chemistry, 27, 1979, p. 163–178. Once again, a statistical disordering is observed in the anionic distribution while some ordering element is given by the cubic cationic array.

These two independent sets of works suggest that removing the order ring element arising from the cations will allow to change the "anion-glass" state in the vitreous state. From this point of view, the common model of all fluoride glasses is that of an homogeneous and aperiodic anion distribution leading to a rather compact medium. Because of the electrostatic repulsion, this anionic medium tends to burst and its cohesion is achieved by cation insertion inside it.

Glass synthesis requires the lack of cation ordering and therefore the cations must be randomly located into the anionic packing. This implies that tach cation has several insertion possibilities and also that the inter cationic forces are weak.

The first of these conditions may be achieved when highly charged ions are present in major proportion. The number of host sites is proportional to the number of anions, each $M^{n+}$ cation with the charge n+ bringing n $F^-$ ions. In the limiting case of a compact packing of spheres, an octahedral cation would have n potential octahedral sites, in other words n different possibilities of insertion. Besides, as the electrostatic interaction energy depends directly on the ionic charges, it is clear that one ion brings a stabilization energy which is higher as it is more charged and as the anion-cation distance is lower. It is then convenient to take into account the ratio $n/R_i$ of the ionic charge to the ionic radius. Depending on their size, the various cations may occupy a fluoride medium tetrahedral, octahedral, prismatic or more complex sites (coordination number 7 to 10). This geometrical factor has a direct influence on the possibility of obtaining disordered vitreous phases. In real packing, small sites are more numerous than the large ones. There are thus two tetrahedral sites for one octahedral site in a compact packing, which increases the possibilities of different insertion. On the other side, the anion-cation bondings are shorter and also the inter-cationic distances are less. The experimental observation shows that excessive electrostatic repulsion between cations induces some competition between tridimensional- and therefore solid-structure and molecular structure, that is to say either a liquid or gaseous state. This phenomenon is in direct proportion with the ratio $n/R_i$ of the ionic charge to the ionic radius of the $M^{n+}$ cation. In practice, the elements whose single fluorides are volatile are unsuited for glass formation, except perhaps at low temperature. This is the case of boron, carbon and silicon whose fluorides are volatile at room temperature.

Although one single cation may form the vitrifying agent, it is often better to associate several cations for energetic and geometric causes. The intercationic repulsive energy being proportional to $n_1n_2/r_{12}$ ($n_1$ and $n_2$ are the respective cationic charges and $r_{12}$ the distance between the two cations). It is then clear that introducing ions whose charge $n_2$ is lower than $n_1$ or whose ionic radius $R_2$ is larger than $R_1$ will lead to decrease this repulsive energy. On the other hand, as the anionic packing exhibits various small sites such as tetrahedra or octahedra and larger sites such as dodecahedra and square antiprisms, a more favourable energetic balance arises if the filling rates of the different sites are close. A classical example is given by the introduction of aluminium fluoride or magnesium fluoride in fluoroberyllate glasses in which the $Al^{3+}$ and $Mg^{2+}$ ions are located in free octahedral sites.

We define as vitrifiers the cations which are able to stabilize energetical the anionic distribution. This concept differs from the previous one of "network former" which implies the existence of a network built from the aperiodic association of geometrically constant polyhedra.

Glass formation implies, first, the thermodynamical stability of the anionic set and also the lack of long-range ordering. The anionic packing must not be compact, otherwise a long range ordering will appear, and the necessity of making a non-compact anionic set results in the appearance of non-octahedral and non-tetrahedral sites in areas where some dislocation of the anion packing can be observed. Because of the electrostatic repulsions, these areas often correspond to instable energy states promoting a more structural reorganization and so, act as nucleating agents, which makes glass prepartion more difficult. This consequence may be compensated by the introduction of cations which are able to be inserted in such areas, which are typically alkaline, earth-alkaline or equivalent ions ($Pb^{2+}$, $Eu^{2+}$, $Bi^{3+}$, $Tl^+$...). The modifier word commonly used for these ions may be kept here, but with a well precise meaning: they modify the periodicity and the compatness of the anionic distribution. It must be noted that this modifier function is in a direct relationship to the ionic size because it implies that the cation is located in a site which is different from those of compact packings, i.e. tetrahedral and octahedral sites. Thus, the same cation may have both vitrifying and modifying functions as previously defined if it exhibits a high charge and a large ionic radius all together, for example $R_i$ 0.8 and n 3. This is the case of thorium, uranium IV and rare earths. Otherwise, it is the advantage of low-charged modifying cations to induce rather weak electrostatic repulsive forces between close cations.

Some physical glass characteristics are related directly to the composition. So the glass transition temperature and the fusion temperature are lowered by large and low-charged ions such as alkaline and earth-alkaline ions. More generally, the physical properties may be correlated to the concentration of the various ions, for example, the refractive index may be evaluated, a priori, with a rather good approximation.

At the end of this analysis based upon the energetic stabilization of a $F^-$ ions packing leading to a vitreous structure, a few simple rules related to cations may be stated:

1. The vitrifying cations must offer a high ration of the ionic charge to the ionic radius $n/R_i$.
2. The anionic distribution must present more numerous host sites than the cations to be inserted.
3. An additional stabilizing effect results from the introduction of cation with a high ionic radius ($R_i$ 0.8) whose roll is to preclude the formation of a compact anionic packing.

The fluoride glasses known up to know all follow these rules, fluoroberyllate glasses as well as fluorozirconate or transition metals fluoride glasses ($VF_3$, $CrF_3$, $FeF_3$, $GaF_3$). The rule n 3 is obviously not realized in the case of vitreous $BeF_2$, but it is clearly made certain in practice by the best quality of the fluoroberyllate glasses compared to vitreous $BeF_2$.

This approach of the vitreous state suggests the possibility of synthetizing many other fluoride glasses. The lithium $Li^+$ is a potential vitrifier because of its ability to occupy tetrahedral or octahedral sites and, although its $n/R_i$ ratio is not very high, it induces only small intercationic repulsive forces. Numerous trivalent ions may vitrify, especially rare earths, indium, yttrium, when these elements are associated with octahedral cations (Mg, Al, transition 3d ions). Most of the tetravalent ions are potential vitrifiers, and beside the already known $Zr^{4+}$ and $Hf^{4+}$ one may quote $Ti^{4+}$, $Nb^{4+}$, $Ce^{4+}$, $Pb^{4+}$, $Sn^{4+}$, $th^{4+}$, $U^{4+}$.

The purpose of the present invention has been to show up the ability of these various cations to form vitreous phases when they are used, alone or associated in major part to mofifiers as it has been previously defined. The convenient amount of modifying elements depends on the chemical system made up by the vitrifier. In some cases, it may be non-existant, for example, when the modifying function as defined in this paper is taken up by a vitrifying element, but on other cases it may exceed 50% molar.

In the glasses related to the present invention, themodifying elements may be the fluoride of alkaline, alkaline earth or equivalent ions, as shown in the following table. The vitrifiers are one or several of the fluorides of non-exclusively octahedral ions represented in the same table. The fluorides may be used alone or in association with the fluorides of octahedral cations such as $AlF_2$, $MgF_2$, $MF_2$ (M=transition metal 3d), or also one or several octahedral vitrifying cations of the table. In this case, the almost relative amounts of octahedral and non-octahedral cation depend on the associated elements. If the combination includes $Al^{3+}$, $Mg^{2+}$ or some mixing of these two ions, the concentration in non-octahedral cations may be up to three times the concentration in non-octahedral vitrifying elements. In the general case, when the octahedral cations belong to the group including gallium and 3d transition metals, this proportion is limited to 1, and 5 for 1 for the most. In the case of scandium and titanium, these elements may be vitrifiers alone if they are associated with modifiers in a convenient proporiton.

Otherwise, the new vitrifying elements may be associated in a variable amount with zirconium or hafnium fluorides whose vitrifying ability has extensively been demonstrated. The $ZrF_4$, $HfF_4$ or binary mixing concentration may reach up to 35% molar of the total concentration.

The vitrifying part may also be acted by lithium fluoride alone in association with one of the former vitrifying combinations.

In practicing the invention, fluoride glasses are made with a vitrifying part which is provided by one or several ionic species belonging to the group $Li^+$, $Sc^{3+}$, $Y^{3+}$, $Ln^{3+}$ (Ln=rate earth), $In^{3+}$, $Tl^{3+}$, $Th^{4+}$, $U^{4+}$, $Nb^{4+}$, $Ti^{4+}$, $Ce^{4+}$, $Sn^{4+}$. The composition includes a modifier of the fluorides belonging to the group NaF, KF, RbF, CsF, TlF, $CaF_2$, $SrF_2$, $EuF_2$, $BaF_2$, $PbF_2$. Also, in the ionic species, the vitrifying part are associated with an octahedral cathion, such as $Al^{3+}$, $Mg^{2+}$, $M^1{}^{2+}$, ($M_1$=Cr, Mn, Fe, Co, Ni, Cu, Zn), $M_2{}^{3+}$ ($M_2$=Cr, V, Fe, Ga). The vitrifying elements may be strengthened by mixing zirconium or hafnium fluoride in a proportion which is not higher that 35% molar. In the more general case, the octahedral cation concentration may reach 1.5 times the concentration of the vitrifying cations, as multiplied by the concentration of aluminum fluoride and magnesium fluoride.

The present invention provides new compositions for preparing fluoride glass and glasses produced by these compositions which are beryllium free and have the following compositions wherein the percentages are indicated as mole %.

Our preferred LiF and NaF glass compositions wherein the percent is mole %, consists essentially of:
10-60% LiF,
10-20% NaF,
0-50% $UF_4$,
0-25% $ThF_4$,
0-25% BaF,
0-40% $ScF_3$,
0-8% $YF_3$.

Our preferred $UF_4$ glass composition wherein the percent is mole %, consists essentially of:
30-50% $UF_4$,
0-30% $AlF_3$,
0-20% $LaF_3$,
0-20% $YF_3$,
0-30% $ThF_4$,
0-25% NaF.

Our preferred $YF_3$ and $AlF_3$ glass composition wherein the percent is mole %, consists essentially of:
20-30% $UF_3$,
25-30% $AlF_3$,
20-24% $BaF_2$,
0-13% $MgF_2$,
0-2% $CaF_2$,
0-2% KF,
0-2% $CeF_3$,
0-25% NaF,
0-30% $YbF_3$,
0-20% $CeF_4$,
0-20% $PbF_4$,
0-20% $NbF_4$,
0-20% $ThF_4$.

Our preferred NaF, $MgF_2$ and $BaF_2$ glass composition wherein the percent is mole %, consists essentially of:
5-20% NaF,
5-15% $MgF_2$,
20% $BaF_2$,
0-50% $UF_4$,
0-30% $AlF_3$,
0-30% $ErF_3$,
0-20% $SnF_3$,
0-20% $YF_3$,
0-20% $TbF_3$,
0-10% $GaF_3$,
0-30% $InF_3$.

The following tables illustrate examples 1 to 27 which in turn illustrate the berryllium-free compositions we used to prepare our beryllium-free fluoride glass. In each of the examples the mixture was prepared in a known manner and in each example the percentages are mole percent and are set forth in the Example's Column.

TABLE I

| Fluoride Compound | Examples Mole % | | | | | | | |
|---|---|---|---|---|---|---|---|---|
| | 1 | 2 | 3 | 4 | 5 | 6 | 7 | 8 |
| $UF_4$ | 30% | 50% | 50% | 30% | 50% | 50% | 50% | 50% |
| NaF | 10% | — | 20% | — | — | 25% | 20% | 20% |
| LiF | 60% | — | 30% | — | — | — | — | — |
| $LaF_3$ | — | 20% | — | — | — | — | — | — |
| $AlF_3$ | — | 30% | — | 20% | 20% | 25% | — | — |
| $YF_3$ | — | — | — | 20% | 30% | — | 20% | — |
| $ThF_4$ | — | — | — | 30% | — | — | — | — |
| $MgF_2$ | — | — | — | — | — | — | 10% | 10% |
| $BaF_2$ | — | — | — | — | — | — | — | 20% |

TABLE II

| Fluoride Compound | Examples Mole % | |
|---|---|---|
| | 9 | 10 |
| LiF | 60% | 10% |
| NaF | 15% | 17% |
| $ThF_4$ | 25% | — |
| $BaF_2$ | — | 25% |
| $ScF_3$ | — | 40% |
| $YF_3$ | — | 8% |

TABLE III

| Fluoride Compound | Mole % Examples | | | | | | |
|---|---|---|---|---|---|---|---|
| | 11 | 12 | 13 | 14 | 15 | 16 | 17 |
| $YF_3$ | 28% | 30% | 26% | 30% | 20% | 20% | 20% |
| $AlF_3$ | 28% | 30% | 28% | 30% | 25% | 25% | 25% |
| $BaF_2$ | 24% | 20% | 20% | 20% | 20% | 20% | 20% |
| $ThF_4$ | 20% | — | — | — | 10% | 10% | 10% |
| $CaF_2$ | — | 2% | 2% | — | — | — | — |
| $MgF_2$ | — | 13% | 15% | — | — | — | — |
| NaF | — | 5% | 5% | 20% | 5% | 5% | 5% |
| KF | — | — | 2% | — | — | — | — |
| $CeF_4$ | — | — | — | — | 20% | — | — |
| $PbF_4$ | — | — | — | — | — | 20% | — |

TABLE III-continued

| Fluoride Compound | Mole % Examples | | | | | | |
|---|---|---|---|---|---|---|---|
| | 11 | 12 | 13 | 14 | 15 | 16 | 17 |
| NbF$_4$ | — | — | — | — | — | — | 20% |

TABLE IV

| Fluoride Compound | Mole % Examples | | | | | |
|---|---|---|---|---|---|---|
| | 18 | 19 | 20 | 21 | 22 | 23 |
| NaF | 5% | 5% | 25% | 15% | 5% | 20% |
| MgF$_2$ | 15% | 15% | 5% | 15% | 15% | 10% |
| BaF$_2$ | 20% | 20% | 20% | 20% | 20% | 20% |
| AlF$_3$ | 30% | 30% | — | 30% | 28% | — |
| ErF$_3$ | 30% | — | — | — | — | — |
| YbF$_3$ | — | 30% | — | — | 26% | — |
| YF$_3$ | — | — | 20% | — | — | 20% |
| TbF$_3$ | — | — | 20% | — | — | — |
| GaF$_3$ | — | — | 10% | — | — | — |
| SnF$_3$ | — | — | — | 20% | — | — |
| KF | — | — | — | — | 2% | — |
| CaF$_2$ | — | — | — | — | 2% | 10% |
| CeF$_3$ | — | — | — | — | 2% | — |
| InF$_3$ | — | — | — | — | — | 30% |

TABLE V

| Fluoride Compound | Mole % Examples | | | |
|---|---|---|---|---|
| | 24 | 25 | 26 | 27 |
| LiF | 60% | 45% | — | — |
| KF | 35% | — | — | — |
| ThF$_4$ | 5% | — | 15% | — |
| BaF$_2$ | — | 20% | 20% | 25% |
| ZrF$_4$ | — | 35% | — | — |
| NaF | — | — | 15% | 25% |
| ScF$_3$ | — | — | 30% | — |
| YF$_3$ | — | — | 20% | — |
| TiF$_4$ | — | — | — | 50% |

A fluoride glass product was produced from each of the above examples by heating each of the compositions to molten mass. Each molten mass was shaken and homogenised in the traditional manner. After appropriate mixing the molten mass was poured and cooled to form a desired glass product.

The molten composition may be formed into the desired glass article by the above type molding or of course can be formed into glass ribbon or fibers by using the known glass ejection methods.

From the above it is apparent that other equivalent and variations are possible and these equivalents are intended to fall within the scope of our invention.

We claim:

1. A fluoride glass composition for preparing fluoride glass consisting of:
   10–60% LiF
   10–20% NaF
   0–50% UF$_4$,
   0–25% ThF$_4$,
   0–25% BaF,
   0–40% ScF$_3$,
   0–8% YF$_3$;
   and wherein all the above percentages are mole percent.

2. The composition of claim 1 consisting of:
   60% LiF,
   10% NaF,
   30% UF$_4$.

3. The composition of claim 1 consisting:
   60% LiF,
   15% NaF,
   25% ThF$_4$.

4. The composition of claim 1 consisting:
   30% LiF,
   20% NaF,
   50% UF$_4$.

5. The composition of claim 1 consisting of:
   10% LiF,
   17% NaF,
   25% BaF$_2$,
   40% ScF$_3$,
   8% YF$_3$.

6. A fluoride glass composition for preparing fluoride glass consisting of:
   30–50% UF$_4$,
   0–30% AlF$_3$,
   0–20% LaF$_3$,
   0–20% YF$_3$,
   0–30% ThF$_4$,
   0–25% NaF
   and wherein all the above percentages are mole percent.

7. The composition of claim 6 consisting of:
   50% UF$_4$,
   30% AlF$_3$,
   20% LaF$_3$.

8. The composition of claim 6 consisting of:
   30% UF$_4$,
   20% AlF$_3$,
   20% YF$_3$,
   30% ThF$_4$.

9. The composition of claim 6 consisting of:
   50% UF$_4$,
   20% AlF$_3$,
   30% YF$_3$.

10. The composition of claim 6 consisting of:
   50% UF$_4$,
   25% AlF$_3$,
   25% NaF.

11. A fluoride glass composition for preparing fluoride glass consisting of:
   20–30% YF$_3$,
   25–30% AlF$_3$,
   20–24% BaF$_2$,
   0–13% MgF$_2$,
   0–2% CaF$_2$,
   0–2% KF,
   0–2% CeF$_3$,
   0–25% NaF,
   0–30% YbF$_3$,
   0–20% CeF$_4$,
   0–20% PbF$_4$,
   0–20% NbF$_4$,
   0–20% ThF$_4$;
   and wherein all the above percentages are mole percent.

12. The composition of claim 11 consisting of:
   28% YF$_3$,
   28% AlF$_3$,
   24% BaF$_2$,
   20% ThF$_4$.

13. The composition of claim 11 consisting of:
   30% YF$_3$,
   30% AlF$_3$,
   20% BaF$_2$,
   20% NaF.

14. The composition of claim 11 consisting of:
   26% YF$_3$,
   28% AlF$_3$,
   20% BaF$_2$, 15% MgF$_2$,
5% NaF,
2% CaF$_2$,
2% KF.

15. The composition of claim 11 consisting of:
30% YF$_3$,
30% AlF$_3$,
20% BaF$_2$,
2% CaF$_2$,
5% NaF,
13% MgF$_2$.

16. The composition of claim 11 consisting of:
20% BaF$_2$,
20% YF$_3$,
25% AlF$_3$,
10% ThF$_4$,
5% NaF,
20% CeF$_4$.

17. The composition of claim 11 consisting of:
20% BaF$_2$,
20% YF$_3$,
25% AlF$_3$,
10% ThF$_4$,
5% NaF,
20% PbF$_4$.

18. The composition of claim 11 consisting of:
20% BaF$_2$,
20% YF$_3$,
25% AlF$_3$,
10% ThF$_4$,
5% NaF,
20% NbF$_4$.

19. A fluoride glass composition for preparing fluoride glass consisting of:
5–20% NaF,
5–15% MgF$_2$,
20% BaF$_2$,
0–50% UF$_4$,
0–30% AlF$_3$,
0–30% ErF$_3$,
0–20% SnF$_3$,
0–20% YF$_3$,
0–20% TbF$_3$,
0–10% GaF$_3$,
0–30% InF$_3$;
and wherein all the above percentages are mole percent.

20. The composition of claim 19 consisting of:
20% NaF,
10% MgF$_2$,
20% BaF$_2$,
50% UF$_4$.

21. The composition of claim 19 consisting of:
5% NaF,
15% MgF$_2$,
20% BaF$_2$,
30% AlF$_3$,
30% ErF$_3$.

22. The composition of claim 19 consisting of:
5% NaF,
15% MgF$_2$,
20% BaF$_2$,
30% AlF$_3$,
30% YbF$_3$.

23. The composition of claim 19 consisting of:
25% NaF,
5% MgF$_2$,
20% BaF$_2$,
20% YF$_3$,
20% TbF$_3$,
10% GaF$_3$.

24. The composition of claim 19 consisting of:
15% NaF,
15% MgF$_2$,
20% BaF$_2$,
30% AlF$_3$,
20% SnF$_3$.

25. The composition of claim 19 consisting of:
20% NaF,
10% MgF$_2$,
20% BaF$_2$,
10% CaF$_2$,
20% YF$_3$,
30% InF$_3$.

26. A fluoride glass composition for preparing fluoride glass consisting of:
60% LiF,
35% KF,
5% ThF$_4$;
and wherein all the above percentages are mole percent.

27. A fluoride glass composition for preparing fluoride glass consisting of:
45% LiF,
20% BaF$_2$,
35% ZrF$_4$;
and wherein all the above percentages are mole percent.

28. A fluoride glass composition for preparing fluoride glass consisting of:
20% NaF,
10% MgF$_2$,
20% YF$_3$,
50% UF$_4$;
and wherein all the above percentages are mole percent.

29. A fluoride glass composition for preparing fluoride glass consisting of:
15% NaF,
20% BaF$_2$,
30% ScF$_3$,
20% YF$_3$,
15% ThF$_4$;
and wherein all the above percentages are mole percent.

30. A fluoride glass composition for preparing fluoride glass consisting of:
5% NaF,
2% KF,
15% MgF$_2$,
2% CaF$_2$,
20% BaF$_2$,
28% AlF$_3$,
2% CeF$_3$,
26% YbF$_3$;
and wherein all the above percentages are mole percent.

31. A fluoride glass composition for preparing fluoride glass consisting of:
25% NaF,
25% BaF$_2$,
50% TiF$_4$;
and wherein all the above percentages are mole percent.

32. A fluoride glass prepared from the composition of claim 1.

33. A fluoride glass prepared from the composition of claim 6.

34. A fluoride glass prepared from the composition of claim 11.

35. A fluoride glass prepared from the composition of claim 19.

36. A fluoride glass prepared from the composition of claim 26.

* * * * *